(12) United States Patent
Shaw

(10) Patent No.: US 9,776,264 B2
(45) Date of Patent: Oct. 3, 2017

(54) RECIPROCATING CUTTER

(71) Applicant: Mike Shaw, Acworth, GA (US)

(72) Inventor: Mike Shaw, Acworth, GA (US)

( * ) Notice: Subject to any disclaimer, the term of this patent is extended or adjusted under 35 U.S.C. 154(b) by 0 days.

(21) Appl. No.: 15/333,052

(22) Filed: Oct. 24, 2016

(65) Prior Publication Data

US 2017/0043420 A1 Feb. 16, 2017

Related U.S. Application Data

(63) Continuation-in-part of application No. 14/198,541, filed on Mar. 5, 2014, now abandoned.

(51) Int. Cl.
B23D 57/00 (2006.01)
B26B 27/00 (2006.01)

(52) U.S. Cl.
CPC ..... B23D 57/0015 (2013.01); B23D 57/0061 (2013.01); B23D 57/0084 (2013.01); B26B 27/002 (2013.01)

(58) Field of Classification Search
CPC ................ B23D 57/00; B23D 57/0007; B23D 57/0015; B23D 57/0061; B23D 57/0084; B26B 27/002
USPC ........ 30/116, 117, 392–394, 514; D8/20, 70, D8/96
See application file for complete search history.

(56) References Cited

U.S. PATENT DOCUMENTS

| 184,804 | A | * | 11/1876 | Stohlmann | ......... B23D 57/0015 30/166.3 |
| 2,728,137 | A | | 12/1955 | Elliott | |
| 2,762,122 | A | * | 9/1956 | Hermann | ................... C14B 1/14 30/116 |
| 2,774,400 | A | * | 12/1956 | Frickhofen | ........ B23D 57/0015 30/502 |
| 3,270,369 | A | | 9/1966 | Mandell | |
| 3,310,082 | A | * | 3/1967 | De La Tramerye | ....................... B23D 57/0015 30/116 |
| 3,461,732 | A | | 8/1969 | Gregory | |

(Continued)

FOREIGN PATENT DOCUMENTS

| AT | 252544 | B | * | 2/1967 | ......... B23D 57/0015 |
| CH | 330221 | A | * | 5/1958 | ......... B23D 57/0015 |

(Continued)

Primary Examiner — Jason Daniel Prone
(74) Attorney, Agent, or Firm — Bradley D. Crose; Crose Law LLC

(57) ABSTRACT

A reciprocating cutter system for use in spaces where a typical saw is unable to operate due to size, space, and operability limitations is disclosed. In at least one embodiment a reciprocating cutter system includes: a housing; a handle disposed on a top portion of the housing to provide an operator a user grip to operate the system; a cable saw coupled to the housing of reciprocating cutter system; a spring disposed within the housing and coupled to the cable saw such that as the cable saw is moved in a back-and-forth motion when in use, the spring also moves in a back-and forth-motion without the operator-held handle needing to move; and a connectivity bit, coupled to the cable saw, to connect the wire saw through the connectivity bit to a reciprocating device, the reciprocating device to provide the back-and-forth motion to the connectivity bit and the cable saw.

18 Claims, 6 Drawing Sheets

(56) References Cited

U.S. PATENT DOCUMENTS

| | | | |
|---|---|---|---|
| 3,495,590 A * | 2/1970 | Zeiller | B23D 57/0015 30/166.3 |
| 3,587,679 A | 6/1971 | Conte | |
| 3,598,101 A | 8/1971 | Hensley | |
| 3,651,844 A * | 3/1972 | Barnes | B23D 57/0015 30/381 |
| 3,895,438 A | 7/1975 | Burkepile | |
| 3,958,332 A | 5/1976 | Gates | |
| RE29,803 E | 10/1978 | Breese | |
| 4,398,347 A * | 8/1983 | Duffy | B26B 27/002 30/90.1 |
| 4,399,602 A * | 8/1983 | Hancock | B23D 57/0015 83/200.1 |
| 4,464,836 A * | 8/1984 | Hissa | B23D 57/0015 30/166.3 |
| 4,484,502 A | 11/1984 | Ebner | |
| 4,674,184 A | 6/1987 | Anderson | |
| 4,995,153 A * | 2/1991 | Asbery | B23D 57/0015 30/116 |
| 5,077,902 A | 1/1992 | Hitt | |
| 5,220,729 A | 6/1993 | Gallant | |
| 5,462,479 A * | 10/1995 | Hajek | B23D 57/0015 30/520 |
| 5,622,093 A * | 4/1997 | Hutchins | B26B 27/002 30/116 |
| 5,752,420 A * | 5/1998 | Connors | B23D 57/0015 30/371 |
| 5,924,209 A | 7/1999 | Ward | |
| 6,282,793 B1 | 9/2001 | Flagg | |
| 6,370,780 B1 | 4/2002 | Robertson | |
| 6,591,502 B1 * | 7/2003 | Gmeilbauer | B26B 27/002 30/116 |
| 6,701,620 B2 * | 3/2004 | Huang | B26B 27/002 30/116 |
| 6,832,606 B2 | 12/2004 | Yamada | |
| 6,851,194 B1 | 2/2005 | Chen | |
| 6,886,550 B2 | 5/2005 | Hauser | |
| 7,089,925 B1 | 8/2006 | Lin | |
| 7,281,536 B1 | 10/2007 | Shibuya | |
| 7,316,069 B2 | 1/2008 | Graybeal | |
| 7,631,584 B2 | 12/2009 | Quinn | |
| D690,176 S | 9/2013 | Ronan | |
| D691,013 S | 10/2013 | Campbell | |
| 2002/0174757 A1 | 11/2002 | Mackie | |
| 2009/0031568 A1* | 2/2009 | Yang | B23D 57/0015 30/353 |
| 2010/0186564 A1 | 7/2010 | Pierce | |
| 2010/0275453 A1 | 11/2010 | Huang | |
| 2010/0325900 A1 | 12/2010 | Muckerheide | |
| 2015/0251257 A1* | 9/2015 | Shaw | B23D 57/0015 30/380 |

FOREIGN PATENT DOCUMENTS

| | | | | |
|---|---|---|---|---|
| CH | 411524 A | * | 4/1966 | ......... B23D 57/0015 |
| FR | 1094962 A | * | 5/1955 | ......... B23D 57/0015 |
| FR | 1191560 A | * | 10/1959 | ......... B23D 57/0015 |
| FR | 1381297 A | * | 12/1964 | ......... B23D 54/0015 |
| FR | 1382157 A | * | 12/1964 | ......... B23D 57/0015 |
| FR | 1398058 A | * | 5/1965 | ......... B23D 57/0015 |
| GB | 163166 A | * | 5/1921 | ......... B23D 57/0015 |
| GB | 770800 A | * | 3/1957 | ......... B23D 57/0015 |
| GB | 1022987 A | * | 3/1966 | ......... B23D 57/0015 |
| OA | 723 A | * | 7/1967 | ......... B23D 57/0015 |

* cited by examiner

RECIPROCATING CUTTER

CROSS REFERENCE TO RELATED APPLICATIONS

This is a continuation-in-part patent application claiming the benefit of U.S. patent application Ser. No. 14/198,541, filed on Mar. 5, 2014 and entitled RECIPROCATING CUTTER, and is incorporated herein by reference in its entirety.

FIELD OF THE INVENTION

The technology described herein relates generally to the fields of cutting tools, power driven saw cutting equipment, and portable oscillating, coping, and reciprocating power saws. More specifically, this technology relates to a reciprocating cutter for use in spaces where a typical saw is unable to operate due to size, space, and operability limitations. Furthermore, this technology relates to a reciprocating cutter having a spring-loaded handle, cable saw, and connectivity bit for coupling to a reciprocating saw or like device.

BACKGROUND OF THE INVENTION

Certain cutting tools, power driven saw cutting equipment, and portable oscillating, coping, and reciprocating power saws are known in the background art that enable one to make cuts with a coping, reciprocating, cutting, or like means. Operating such devices in areas that are limited in space provides additional difficulties. Known devices and systems are inefficient to effectively overcome such difficulties. Others have attempted to overcome these deficiencies with hanging devices of various constructions; however, these devices also have been found to have various shortcomings and deficiencies as well.

Related utility patents known in the art include the following:

U.S. Pat. No. 5,077,902, issued to Hitt on Jan. 7, 1992, discloses a power driven vibrating wire saw.

U.S. Pat. No. 5,924,209, issued to Ward on Jul. 20, 1999, discloses a powered coping saw.

U.S. Pat. No. 3,895,438, issued to Burkepile et al. on Jul. 22, 1975, discloses a Styrofoam cutting tool.

U.S. Pat. No. 3,587,679, issued to Conte on Jun. 28, 1971, discloses a portable cable saw.

U.S. Pat. No. 5,220,729, issued to Gallant on Jun. 22, 1993, discloses a hand-held wire saw.

U.S. Pat. No. 3,598,101, issued to Hensley on Aug. 10, 1971, discloses a wire saw.

U.S. Pat. No. 3,270,369, issued to Mandell on Sep. 6, 1966, discloses a reciprocating saw.

U.S. Pat. No. 3,461,732, issued to Gregory on Aug. 19, 1969, discloses a portable power driven reciprocating saw.

U.S. Pat. No. 6,851,194, issued to Chen et al. on Feb. 8, 2005, discloses a reciprocating saw having a blade holding device.

U.S. Pat. No. 7,631,584, issued to Quinn on Dec. 15, 2009, discloses a tool adaptor for use with a reciprocating saw.

U.S. Pat. No. 6,370,780, issued to Robertson et al. on Apr. 16, 2002, discloses a spring-biased cutting tool for plastic pipes.

U.S. Patent No. Re. 29,803, reissued to Breese on Oct. 7, 1978, discloses a pipe cutting tool.

Related U.S. patent application publications known in the art include the following:

U.S. Patent Application Publication No. 2010/0186564, filed by Pierce and published on Jul. 29, 2010, discloses a wire saw.

Related design patents known in the art include the following:

U.S. Patent No. Des. 690,176, issued to Ronan on Sep. 24, 2013, discloses the ornamental design for a PVC cutter.

The foregoing patent and other information reflect the state of the art of which the inventor is aware and are tendered with a view toward discharging the inventor's acknowledged duty of candor in disclosing information that may be pertinent to the patentability of the technology described herein. It is respectfully stipulated, however, that the foregoing patent and other information do not teach or render obvious, singly or when considered in combination, the inventor's claimed invention.

BRIEF SUMMARY OF THE INVENTION

In various exemplary embodiments, the technology described herein provides a reciprocating cutter for use in spaces where a typical saw is unable to operate due to size, space, and operability limitations. Additionally, the technology described herein provides a reciprocating cutter having a spring-loaded handle, cable saw, and connectivity bit for coupling to a reciprocating saw or like device.

In one exemplary embodiment, the technology described herein provides a reciprocating cutter system for use in spaces where a typical saw is unable to operate due to size, space, and operability limitations. The reciprocating cutter system includes: a housing; a handle securely disposed on a top portion of the housing to provide an operator a user grip to operate the system; a cable saw; an anchor disposed within the housing; a spring securely disposed within the housing and coupled to the anchor which is coupled to the cable saw such that as the cable saw is moved in a back-and-forth motion when in use, the spring and anchor also move in a back-and forth-motion without the operator-held handle needing to move; and a connectivity bit, coupled to the cable saw, to connect the cable saw through the connectivity bit to a reciprocating device, the reciprocating device to provide the back-and-forth motion to the connectivity bit and therefore the cable saw.

In at least one embodiment, the reciprocating cutter system also includes: a first pin with which to couple the cable saw to the housing of reciprocating cutter system; and a second pin with which to couple the cable saw to the connectivity bit to connect the wire saw to the reciprocating device. The cable saw is thus interchangeable and replaceable.

In at least one embodiment, the reciprocating cutter system further includes an end cap securely disposed about a circumference of the housing at a distal end of the housing from the handle to provide a backstop to the spring securely disposed within the housing, the end cap further defined by an aperture in the center of the end cap and the aperture of a diameter just larger than the cable saw such that the cable saw feeds through the aperture to couple to the spring securely disposed within the housing.

In at least one embodiment, the reciprocating cutter system also includes a cable guide securely disposed to the end cap at the distal end of the housing to provide a guide to the cable saw as the cable saw moves in the back-and-forth motion within the end cap of the housing and to prevent wear by the cable saw to the end cap.

In at least one embodiment of the reciprocating cutter system, the handle comprises a rigid handle having two wings with which to grip the reciprocating cutter system.

In at least one embodiment of the reciprocating cutter system, the handle comprises a wire loop handle with which to grip the reciprocating cutter system.

In at least one embodiment, the reciprocating cutter system also includes a protective sheath to cover the wire loop handle and protect the hand of the operator from wear.

In at least one embodiment, the reciprocating cutter system further includes an aperture disposed within the connectivity bit for coupling to the reciprocating device to lock in place the connectivity bit to the reciprocating device.

In at least one embodiment of the reciprocating cutter system, the connectivity bit coupled to the cable saw is generally cylindrical on a first end and having an opening within which to receive and couple the cable saw with a pin extending through the cylindrical first end and a fastener to the cable saw and substantially flat on a second end for placement within a receiving area the reciprocating device.

In another exemplary embodiment, the technology described herein provides a disposable reciprocating cutter system for use in spaces where a typical saw is unable to operate due to size, space, and operability limitations. In this embodiment, the reciprocating cutter system includes: a housing; a loop handle securely disposed on a top portion of the housing to provide an operator a user grip to operate the system; a cable saw; an anchor disposed within the housing; a spring securely disposed within the housing and coupled to the anchor which is coupled to the cable saw such that as the cable saw is moved in a back-and-forth motion when in use, the spring and anchor also moves in a back-and forth-motion without the operator-held handle needing to move; an end cap securely disposed about a circumference of the housing at a distal end of the housing from the handle to provide a backstop to the spring securely disposed within the housing, the end cap further defined by an aperture in a center of the end cap and the aperture of a diameter just larger than the cable saw such that the cable saw feeds through the aperture to couple to the spring via the anchor; a cable guide securely disposed to the end cap at the distal end of the housing to provide a guide to the cable saw as the cable saw moves in the back-and-forth motion within the end cap of the housing; a connectivity bit integrally formed with the cable saw, to connect the wire saw through the connectivity bit to a reciprocating device, the reciprocating device to provide the back-and-forth motion to the connectivity bit and therefore the cable saw. The cable saw is utilized without coupling pins and is disposable.

In at least one embodiment, the disposable reciprocating cutter system also includes an end cap securely disposed about a circumference of the housing at a distal end of the housing from the handle to provide a backstop to the spring securely disposed within the housing, the end cap further defined by an aperture in the center of the end cap and the aperture of a diameter just larger than the cable saw such that the cable saw feeds through the aperture to couple to the spring securely disposed within the housing.

In at least one embodiment, the disposable reciprocating cutter system also includes a protective sheath to cover the wire loop handle and protect the hand of the operator from wear.

In at least one embodiment, the disposable reciprocating cutter system further includes an aperture disposed within the connectivity bit for coupling to the reciprocating device to lock in place the connectivity bit to the reciprocating device.

In at least one embodiment of the disposable reciprocating cutter system, the connectivity bit coupled to the cable saw is generally cylindrical on a first end and having an opening within which to receive and couple the cable saw with a pin extending through the cylindrical first end and a fastener to the cable saw and substantially flat on a second end for placement within a receiving area the reciprocating device.

In another exemplary embodiment, the technology described herein provides a reciprocating cutter system for use in spaces where a typical saw is unable to operate due to size, space, and operability limitations. The reciprocating cutter system includes: a power-driven reciprocating tool to provide a back-and-forth motion; a housing; a handle disposed on a top portion of the housing to provide an operator a user grip to operate the system; a cable saw; an anchor disposed within the housing; a spring securely disposed within the housing and coupled to the anchor which is coupled to the cable saw such that as the cable saw is moved in a back-and-forth motion when in use, the spring and anchor also moves in a back-and forth-motion without the operator-held handle needing to move; and a connectivity bit, coupled to the cable saw, to connect the wire saw through the connectivity bit to the power-driven reciprocating tool, the power-driven reciprocating tool to provide the back-and-forth motion to the connectivity bit and therefore the cable saw.

In at least one embodiment, the reciprocating cutter system also includes: a first pin with which to couple the cable saw to the housing of reciprocating cutter system; and a second pin with which to couple the cable saw to the connectivity bit to connect the wire saw to the reciprocating device. The cable saw is thus interchangeable and replaceable.

In at least one embodiment, the reciprocating cutter system further includes: an end cap securely disposed about a circumference of the housing at a distal end of the housing from the handle to provide a backstop to the spring securely disposed within the housing, the end cap further defined by an aperture in the center of the end cap and the aperture of a diameter just larger than the cable saw such that the cable saw feeds through the aperture to couple to the spring securely disposed within the housing; an anchor disposed within the housing and also within a center channel of the spring and coupled to the cable saw, thereby configured to fasten securely the cable saw to the spring; and a protective sheath to cover the wire loop handle and protect the hand of the operator from wear.

In at least one embodiment, the reciprocating cutter system further includes an aperture disposed within the connectivity bit for coupling to the reciprocating device to lock in place the connectivity bit to the reciprocating device. The connectivity bit coupled to the cable saw is generally cylindrical on a first end and having an opening within which to receive and couple the cable saw with a pin extending through the cylindrical first end and a fastener to the cable saw and substantially flat on a second end for placement within a receiving area the reciprocating device.

Advantageously, the technology described herein provides a reciprocating cutter for use in spaces where a typical saw is unable to operate due to size, space, and operability limitations. Known cutting devices are incapable of achieving the functionality of the disclosed device as describe herein.

Also advantageously, the technology described herein provides a reciprocating cutter having a spring-loaded handle, cable saw, and connectivity bit for coupling to a reciprocating saw or like device. Such a configuration is not known in the art and provides solutions to many problem events due to size, space, and operability limitations.

There has thus been outlined, rather broadly, the more important features of the technology in order that the detailed description thereof that follows may be better understood, and in order that the present contribution to the art may be better appreciated. There are additional features of the technology that will be described hereinafter and which will form the subject matter of the claims appended hereto. In this respect, before explaining at least one embodiment of the technology in detail, it is to be understood that the invention is not limited in its application to the details of construction and to the arrangements of the components set forth in the following description or illustrated in the drawings. The technology described herein is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the technology described herein.

Further objects and advantages of the technology described herein will be apparent from the following detailed description of a presently preferred embodiment which is illustrated schematically in the accompanying drawings.

BRIEF DESCRIPTION OF THE DRAWINGS

The technology described herein is illustrated with reference to the various drawings, in which like reference numbers denote like device components and/or method steps, respectively, and in which.

DETAILED DESCRIPTION OF THE INVENTION

Figure 1:
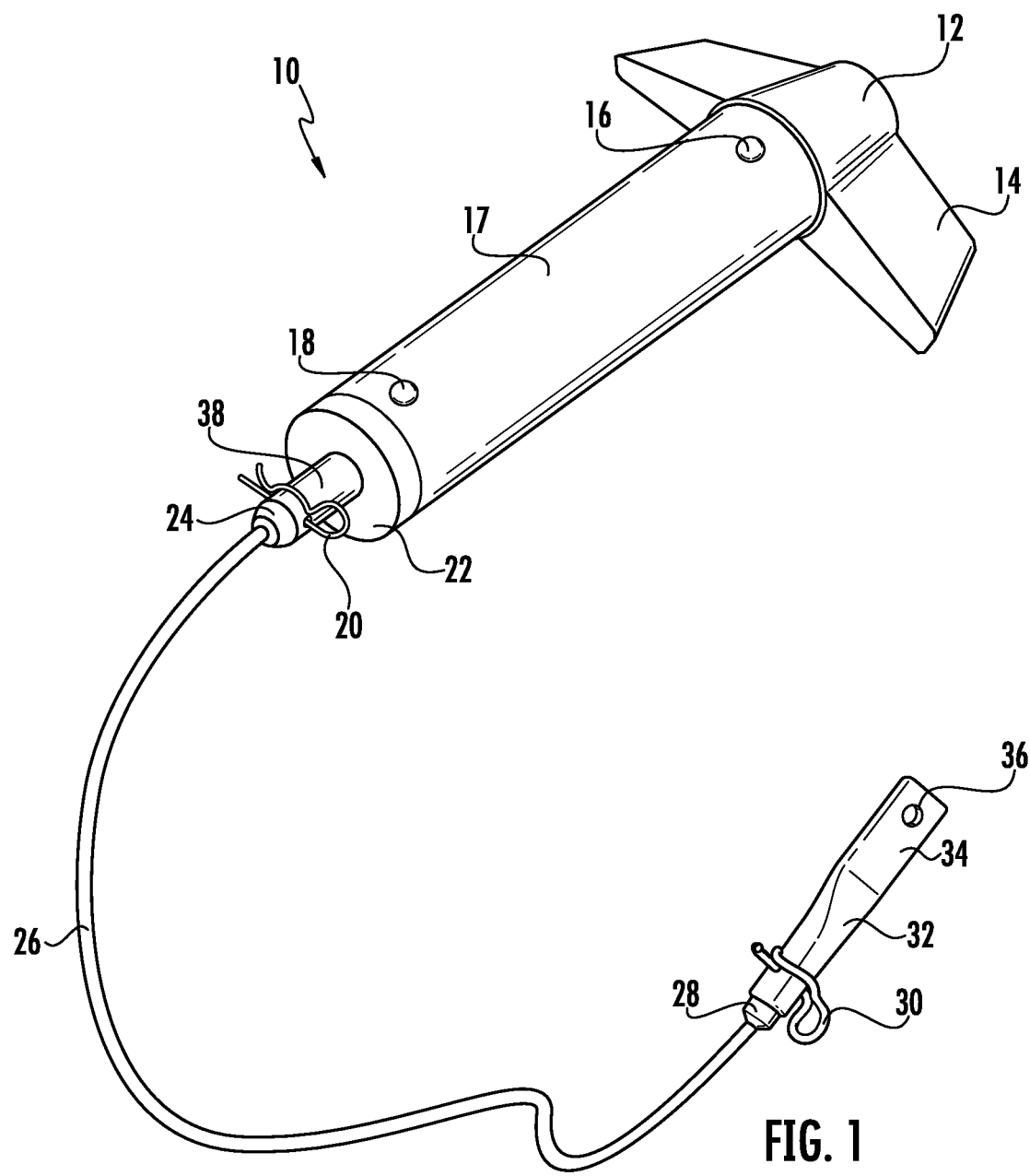
FIG. 1 is a front perspective view of a reciprocating cutter system for use in spaces where a typical saw is unable to operate due to size, space, and operability limitations, illustrating, in particular, a spring-loaded handle, a cable saw, coupling pins, and a connectivity bit for coupling to a reciprocating saw or like device, according to an embodiment of the technology described herein.
Figure 2:
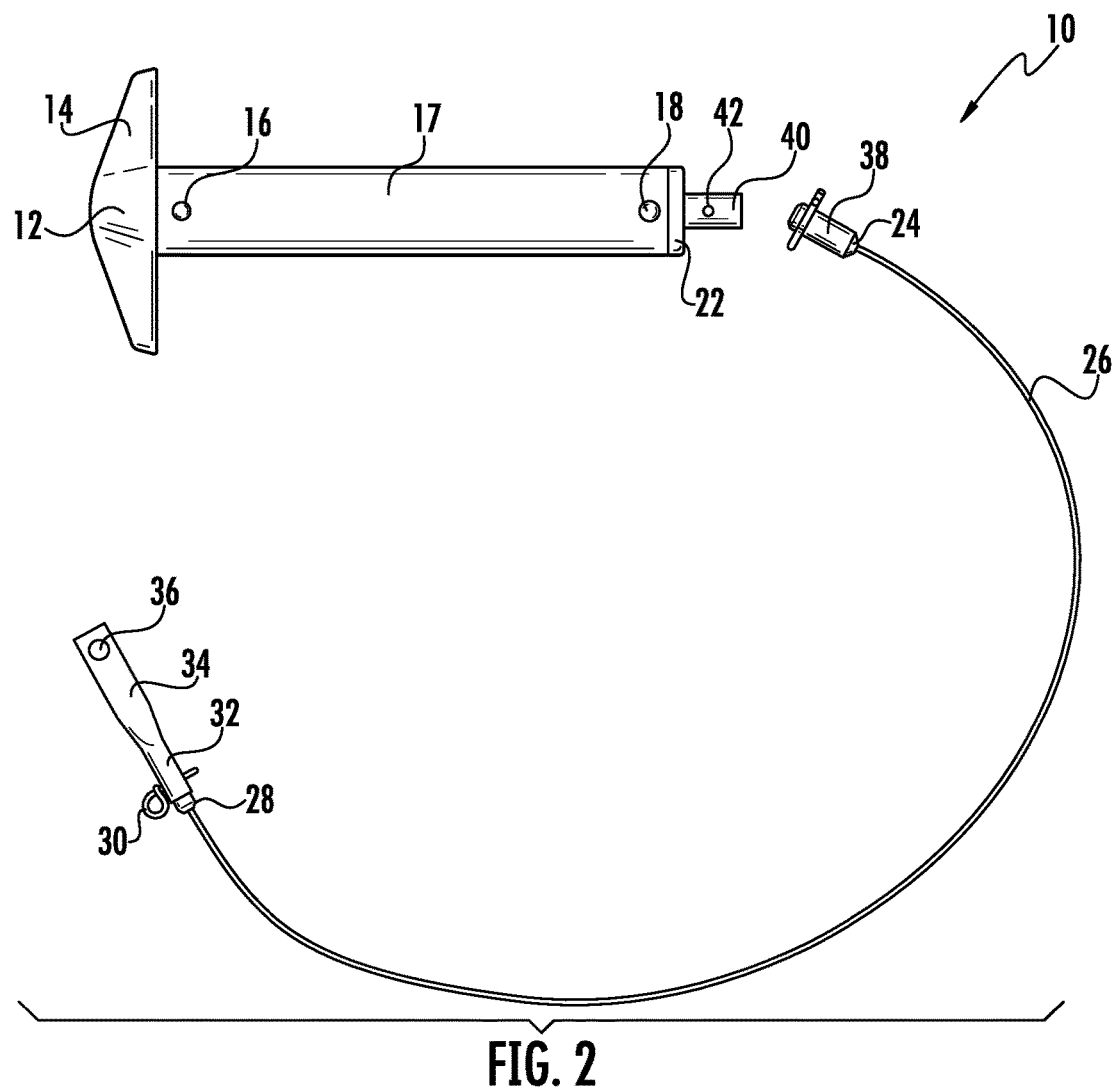
FIG. 2 is a side view of the reciprocating cutter system depicted in FIG. 1, and illustrating, in particular, how the cable saw portion is coupled to the handle portion, according to an embodiment of the technology described herein.

Before describing the disclosed embodiments of this technology in detail, it is to be understood that the technology is not limited in its application to the details of the particular arrangement shown here since the technology described is capable of other embodiments. Also, the terminology used herein is for the purpose of description and not of limitation.

In various exemplary embodiments, the technology described herein provides a reciprocating cutter for use in spaces where a typical saw is unable to operate due to size, space, and operability limitations. Additionally, the technology described herein provides a reciprocating cutter having a spring-loaded handle, cable saw, and connectivity bit for coupling to a reciprocating saw or like device. Furthermore, various embodiments include a cable saw cutter system that is used many times and in which the cable portion is interchangeable and replaceable, a disposable cable saw cutter system, and a complete cable saw system that also includes a reciprocating device.

Referring now to the figures, a reciprocating cutter system 10 is shown. The reciprocating cutter system 10 is configured for use in spaces where a typical saw is unable to operate due to size, space, and operability limitations.

The reciprocating cutter system 10 includes a housing 17. In at least one embodiment, the housing 17 is metal. In at least one embodiment, the housing 17 is plastic and transparent such that one can observe the internal workings, such as the spring 43 extending and retracting in action. The housing 17 is comprised of a sturdy, rigid material for use with power tools such as a reciprocating device 50, for example. The housing 17 provides an enclosure for system elements defined below, and is designed to regular use with the reciprocating device 50.

The reciprocating cutter system 10 includes a handle 12 securely disposed on a top portion of the housing 17 to provide an operator a user grip to operate the system. The handle 12 includes in at least one embodiment a pair of handle flanges 14 or wings with which a user can grip the handle 12. The handle 12 is metal and solid in at least one embodiment. The handle 12 is a sturdy plastic material in at least one alternative embodiment.

Figure 6:
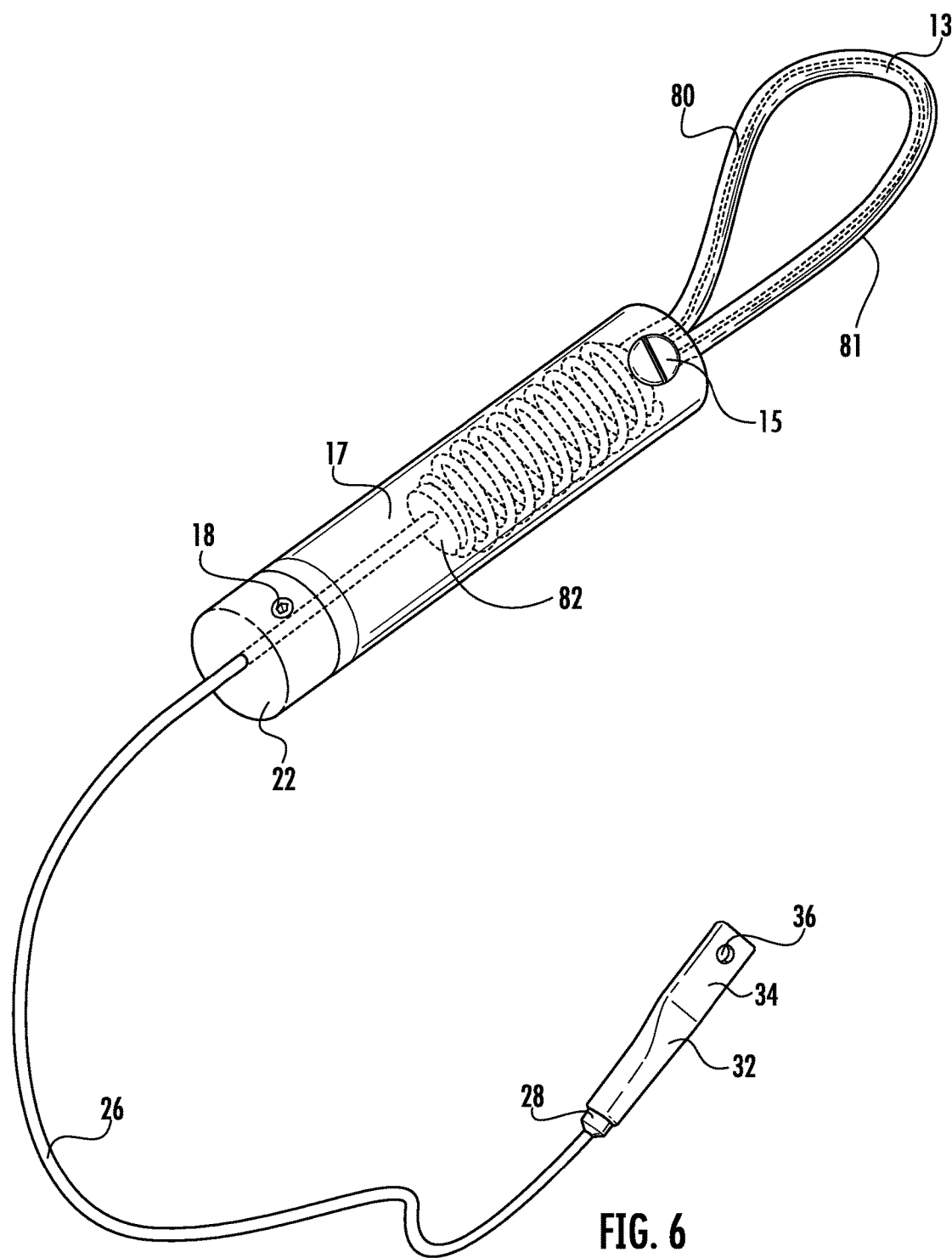
FIG. 6 is a front perspective view of a reciprocating cutter system similar to that depicted in FIG. 1, but illustrating, in particular, a more permanent, disposable version having no connectivity pins and having a loop handle, according to an embodiment of the technology described herein.

In at least one embodiment, the handle is a loop handle 13, as is depicted specifically in FIG. 6. In this embodiment, the handle 13 can be a wire 80. The loop handle 13 is coupled to the housing 17 and fastener 15, which securely holds the handles to the housing. The embodiment can further include a protective sheath 81 to cover the wire 80 loop handle 13 and protect the hand of the operator from wear.

The reciprocating cutter system 10 includes a cable saw 26 coupled to the housing 17 of reciprocating cutter system 10 via an anchor and spring, defined below. The cable 26 is a wire saw in at least one embodiment. The cable saw 26 is the key cutting component of the devices and systems disclosed herein. As the cable saw 26 is moved rapidly in a back-and-forth manner, such as when coupled to reciprocating device 50, the cable saw provides a cutting action on an item.

By way of example, in plumbing, one can use the reciprocating cutter system 10 to cut a PVC pipe, for example. The reciprocating cutter system 10 provides a means to rapidly cut such a PVC pipe, and enable the operator to do so in places where a traditional reciprocating saw, or the like, would not have adequate space in which to operate safely and properly.

In various embodiments, the cable saw 26 is a more permanent solution with the wire itself being replaceable and interchangeable as needed. In alternative embodiments, and as will be discussed below, the cable saw 26 is disposable after a certain number of uses or hours. In various embodiments, the cable saw 26 can vary in gages of wire used. Additionally, in various embodiments, the cable saw 26 can include additional cutting aids, such as bits, for example.

In various embodiments, the cable saw 26 includes fasteners. By way of example, first fastener 24 is coupled to cable saw 26 and provides a means by which the cable saw 26 base end 38 is coupled within the cable guide 40 and secured with first pin 20. Also, by way of example, the second fastener 28 is coupled to the cable saw 26 and provides a means by which the cable saw 26 is coupled to the connectivity bit 32 and secured with second pin 30.

Figure 5:
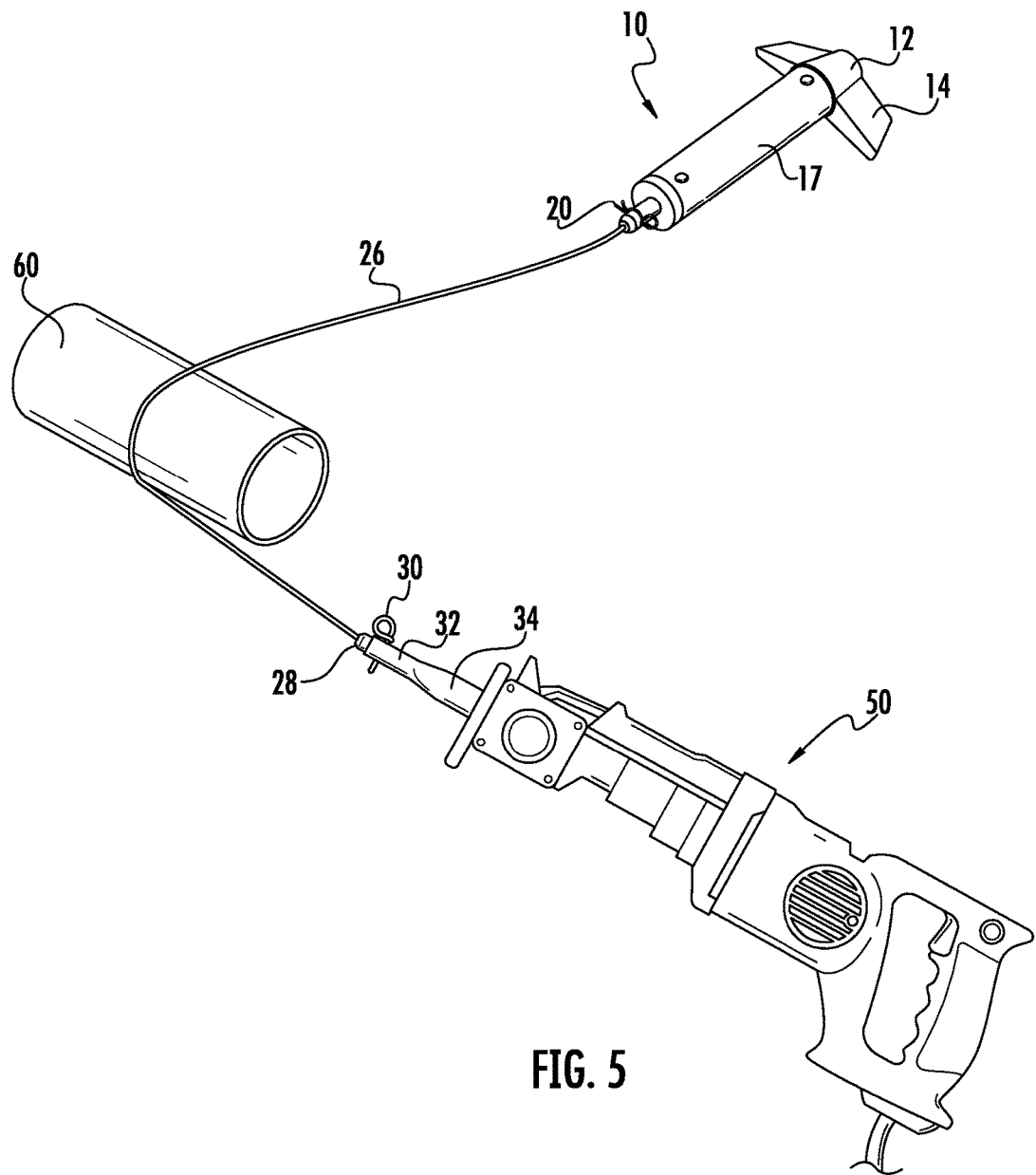
FIG. 5 is a perspective view of the reciprocating cutter system depicted in FIG. 1, and illustrating, in particular, the device in use with a reciprocating saw and cutting a piece of pipe, for example, with the cable saw portion, according to an embodiment of the technology described herein.

The reciprocating cutter system 10 includes a spring 43 securely disposed within the housing 17 and coupled to the cable saw 26. As the cable saw 26 is moved in a back-and-forth motion when in use, such as when pulled by reciprocating device 50 depicted in FIG. 5, the spring 43 also moves in a back-and forth-motion without the operator-held handle 12 needing to move. The spring-loaded handle 12 thus provides the operator a means by which to "hold" the end of the cable saw opposite the reciprocating device 50, and the spring 43 contained within the housing is a shock absorber and enabler for the back-and-forth reciprocating motion. Spring stop washer 41 disposed between spring 43 and cable guide 40 prevents the spring 43 from being overextended. Rivets 18 hold the end cap 22 in place but do not impact movement of the anchor 42 going back and forth when the device is in use. Pin 16 holds a base in place to which the spring 43 attaches below the handle portion. That end of the spring 43 is generally fixed in terms of movement, while the other end of spring 43 moves back and forth, from which the cable saw 26 pulls, when the device is in use and the cable saw 26 is reciprocating.

Figure 4:
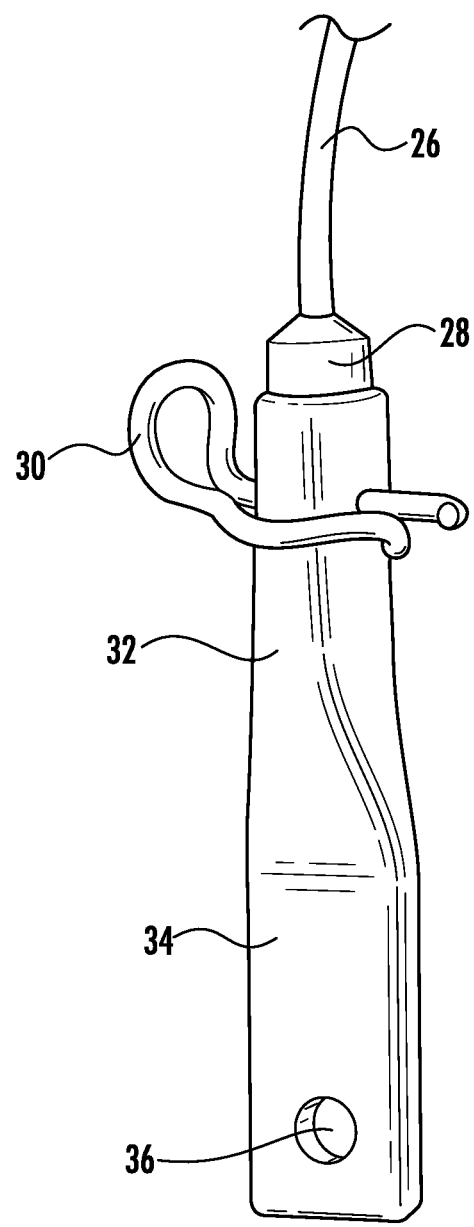
FIG. 4 is a close-up view of the connectivity bit for coupling to a reciprocating saw or like device, illustrating, in particular, a coupling pin to couple the wire saw to the connectivity bit, and the flat saw-blade-like shape of the connectivity bit for use in a reciprocating saw when the device is in use, according to an embodiment of the technology described herein.

The reciprocating cutter system 10 includes a connectivity bit 32. The connectivity bit 32 is depicted in close-up view in FIG. 4. The connectivity bit 32 is coupled to the cable saw 26 and connect the cable saw 26 through the connectivity bit 32 to a reciprocating device 50. The reciprocating device 50 provides the back-and-forth motion to the connectivity bit 32 and therefore the cable saw 26. In at least one embodiment, the cable saw 26 and the connectivity bit 32 are integrally formed and used as a single item.

In at least one embodiment, the connectivity bit 32 further includes an aperture 36. The aperture 36 enables the connectivity bit 32 to be coupled to the reciprocating device 50 to lock in place the connectivity bit 32 to the reciprocating device 50. The aperture 36 is designed to enable an operator to quickly and easily interchange the connectivity bit 32 with the reciprocating device 50.

In at least one embodiment, the connectivity bit 32, which coupled to the cable saw 26, is generally cylindrical on a first end (near 32) to receive the cable saw 26 and fastener 28, and held in place by pin 30, and substantially flat on a second end 34 for placement within a receiving area the reciprocating device 50. Between the cylindrical area (near 32) and the substantially flat end 34 is a gentle taper going from the cylindrical shape to the flat element.

In at least one embodiment, the reciprocating cutter system 10 includes a first pin 20 with which to couple the cable saw 26 to the housing 17 of reciprocating cutter system 10. The reciprocating cutter system 10 also includes a second pin 30 with which to couple the cable saw 26 to the connectivity bit 32 to connect the cable saw 26 to the reciprocating device 50. The cable saw 26 is thus interchangeable and replaceable in this embodiment. In alternative embodiments, the cable saw 26 is integrally formed with the connectivity bit 32. In alternative embodiments, the cable saw 26 is integrally formed with the housing 17.

Figure 3:
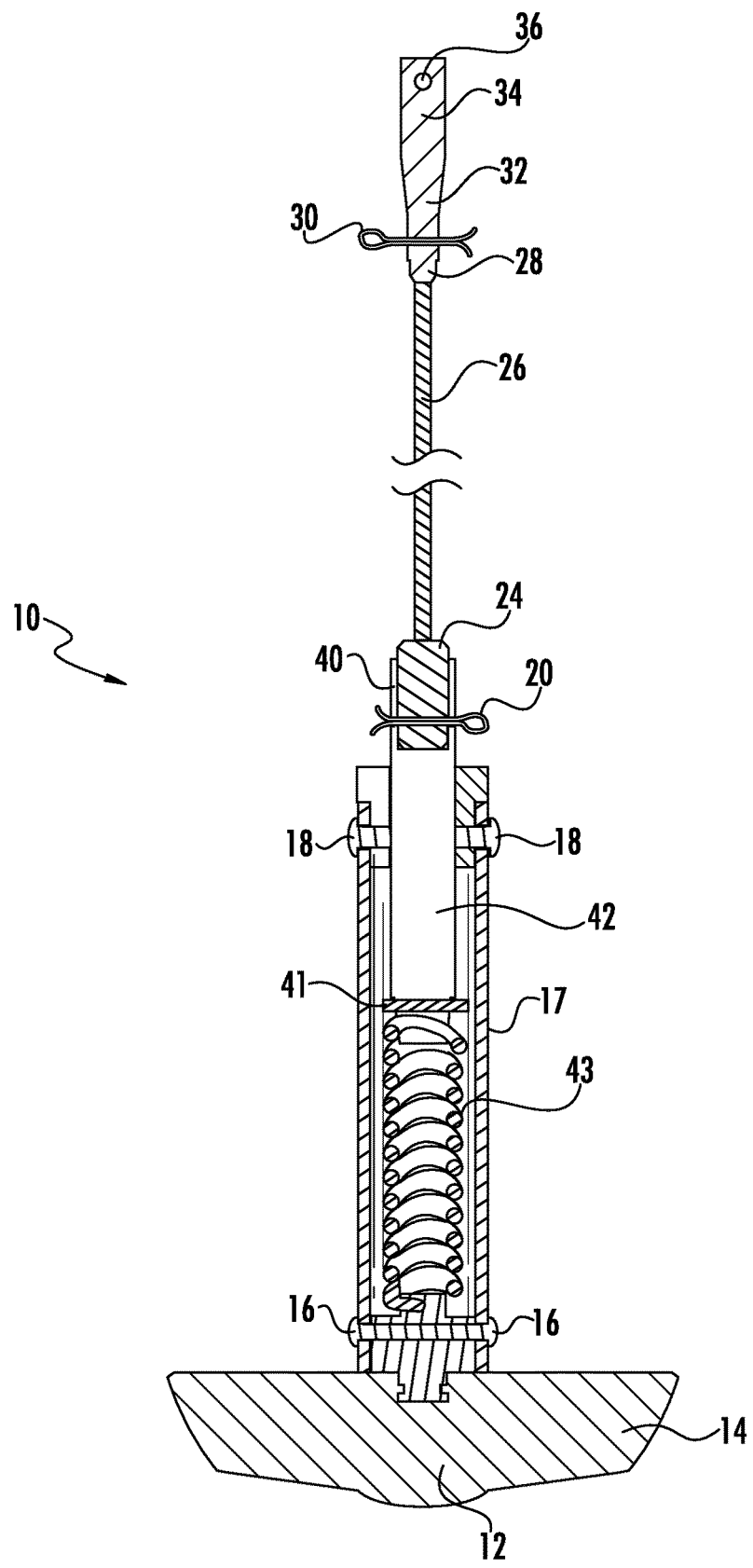
FIG. 3 is a cross section view of the reciprocating cutter system depicted in FIG. 1, and illustrating, in particular, the internal spring portion of the system that counteracts the reciprocating motion of an attached reciprocating saw when the device is in use, according to an embodiment of the technology described herein.

The reciprocating cutter system 10 includes an end cap 22 securely disposed about a circumference of the housing 17 at a distal end of the housing 17 from the handle 12. The end cap 22 provides a backstop to the spring 43 securely disposed within the housing 17. The end cap 22 further defined by an aperture in the center of the end cap 22. The aperture is of a diameter just larger than that of the cable saw 26 such that the cable saw 26 feeds through the aperture to couple to the spring 43 securely disposed within the housing 17. The end cap 22 is held in place by rivets 18, as shown in FIG. 3.

The reciprocating cutter system 10 includes a cable guide 40. The cable guide 40 is securely disposed to the end cap 22 at the distal end of the housing 17. The cable guide 40 provides a guide to the cable saw 26 as the cable saw 26 moves in the back-and-forth motion, as reciprocated by the reciprocating device 50 for example, within the end cap 22 of the housing 17. The cable guide 40 therefore aids in the prevention of wear by the cable saw 26 to the end cap 22.

The reciprocating cutter system 10 includes an anchor 42 disposed within the housing 17. The anchor 42 is configured to fasten securely the cable saw 26 to the spring 43, as shown for example in FIG. 3 where near stop washer 41 the spring 43 is coupled to the anchor 42 where at least one thread or rotation of the spring is within an aperture of the anchor 42. The anchor 42 is comprised of a sturdy metal in at least one embodiment.

As depicted in FIG. 6, the reciprocating cutter system 10 in at least one embodiment is a disposable version. The disposable version of the reciprocating cutter system 10 is configured for use in spaces where a typical saw is unable to operate due to size, space, and operability limitations and once used a certain numbers of times or a certain number of hours is disposable.

The disposable reciprocating cutter system includes: a housing 17; a loop handle 13 securely disposed on a top portion of the housing to provide an operator a user grip to operate the system; a cable saw 26 coupled to the housing of reciprocating cutter system; a spring 43 (within the housing 17, but as shown in FIG. 3) securely disposed within the housing 17 and coupled to the cable saw 26 at 82 such that as the cable saw 26 is moved in a back-and-forth motion when in use, the spring 43 also moves in a back-and forth-motion without the operator-held handle needing to move; and a cable guide 40 securely disposed to the end cap 22 at the distal end of the housing 17 to provide a guide to the cable saw 26 as the cable saw 26 moves in the back-and-forth motion within the end cap 22 of the housing 17 and to prevent wear by the cable saw 26 to the end cap 22; and a connectivity bit 32 integrally formed with the cable saw 26, to connect the cable saw 26 through the connectivity bit 26 to a reciprocating device 50, the reciprocating device 50 to provide the back-and-forth motion to the connectivity bit and therefore the cable saw 26. In this disposable embodiment, the cable saw 26 is utilized without coupling pins and is disposable. Rivets 16, 18 or the like are utilized instead of pins.

In this embodiment, the disposable reciprocating cutter system includes a fastener 15. The fastener 15 secure the loop handle 13 to the housing 13. Additionally, elements that can be included in the disposable version have been defined previously in regard to the non-disposable version.

In another exemplary embodiment, a complete reciprocating cutter system for use in spaces where a typical saw is unable to operate due to size, space, and operability limitations also includes a reciprocating device.

In this complete system embodiment, the reciprocating cutter system 10 includes: a power-driven reciprocating tool 50 to provide a back-and-forth motion; a housing 17; a handle 12 disposed on a top portion of the housing 12 to provide an operator a user grip to operate the system; a cable saw 26 coupled to the housing 17 of reciprocating cutter system; a spring 43 securely disposed within the housing 17 and coupled to the cable saw 26 such that as the cable saw 26 is moved in the back-and-forth motion when in use coupled to the power-driven reciprocating tool, the spring 43 also moves in a back-and forth-motion without the operator-held handle needing to move; and a connectivity bit 32, coupled to the cable saw 26, to connect the cable saw 26 through the connectivity bit 32 to the power-driven reciprocating tool 50, the power-driven reciprocating tool 50 to provide the back-and-forth motion to the connectivity bit and therefore the cable saw.

Although this technology has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the invention and are intended to be covered by the following claims.

What is claimed is:

1. A reciprocating cutter system comprising:
   a housing;
   a handle securely disposed on a top portion of the housing to provide an operator a user grip to operate the system;
   a cable saw;
   an anchor disposed within the housing;
   a spring securely disposed within the housing and coupled to the anchor which is coupled to the cable saw such that as the cable saw is moved in a back-and-forth motion when in use, the spring and anchor also move in a back-and forth-motion without the operator-held handle needing to move; and
   a connectivity bit, coupled to the cable saw, to connect the cable saw through the connectivity bit to a reciprocating device, the reciprocating device to provide the back-and-forth motion to the connectivity bit and therefore the cable saw.

2. The reciprocating cutter system of claim 1, further comprising:
   a first pin with which to couple the cable saw to the housing of reciprocating cutter system;
   a second pin with which to couple the cable saw to the connectivity bit to connect the cable saw to the reciprocating device;
   wherein the cable saw is thus interchangeable and replaceable.

3. The reciprocating cutter system of claim 1, further comprising:
   an end cap securely disposed about a circumference of the housing at a distal end of the housing from the handle to provide a backstop to the spring securely disposed within the housing, the end cap further defined by an aperture in a center of the end cap and the aperture of a diameter just larger than the cable saw such that the cable saw feeds through the aperture to couple to the spring via the anchor.

4. The reciprocating cutter system of claim 3, further comprising:
   a cable guide securely disposed to the end cap at the distal end of the housing to provide a guide to the cable saw as the cable saw moves in the back-and-forth motion within the end cap of the housing.

5. The reciprocating cutter system of claim 1, wherein the handle comprises a rigid handle having two wings with which to grip the reciprocating cutter system.

6. The reciprocating cutter system of claim 1, wherein the handle comprises a loop handle with which to grip the reciprocating cutter system.

7. The reciprocating cutter system of claim 6, further comprising:
   a protective sheath to cover the loop handle and protect the hand of the operator from wear.

8. The reciprocating cutter system of claim 1, further comprising:
   an aperture disposed within the connectivity bit for coupling to the reciprocating device to lock in place the connectivity bit to the reciprocating device.

9. The reciprocating cutter system of claim 1, wherein the connectivity bit coupled to the cable saw is generally cylindrical on a first end and having an opening within which to receive and couple the cable saw with a pin extending through the cylindrical first end and a fastener to the cable saw and substantially flat on a second end for placement within a receiving area the reciprocating device.

10. A disposable reciprocating cutter system comprising:
   a housing;
   a loop handle securely disposed on a top portion of the housing to provide an operator a user grip to operate the system;
   a cable saw;
   an anchor disposed within the housing;
   a spring securely disposed within the housing and coupled to the anchor which is coupled to the cable saw such that as the cable saw is moved in a back-and-forth motion when in use, the spring and anchor also moves in a back-and forth-motion without the operator-held handle needing to move; and
   an end cap securely disposed about a circumference of the housing at a distal end of the housing from the handle to provide a backstop to the spring securely disposed within the housing, the end cap further defined by an aperture in a center of the end cap and the aperture of a diameter just larger than the cable saw such that the cable saw feeds through the aperture to couple to the spring via the anchor;
   a cable guide securely disposed to the end cap at the distal end of the housing to provide a guide to the cable saw as the cable saw moves in the back-and-forth motion within the end cap of the housing;
   a connectivity bit integrally formed with the cable saw, to connect the cable saw through the connectivity bit to a reciprocating device, the reciprocating device to provide the back-and-forth motion to the connectivity bit and therefore the cable saw;

wherein the cable saw is utilized without coupling pins and is disposable.

11. The disposable reciprocating cutter system of claim 10, further comprising:

an end cap securely disposed about a circumference of the housing at a distal end of the housing from the handle to provide a backstop to the spring securely disposed within the housing, the end cap further defined by an aperture in a center of the end cap and the aperture of a diameter just larger than the cable saw such that the cable saw feeds through the aperture to couple to the spring securely disposed within the housing.

12. The disposable reciprocating cutter system of claim 10, further comprising:

a protective sheath to cover the wire loop handle and protect the hand of the operator from wear.

13. The disposable reciprocating cutter system of claim 10, further comprising:

an aperture disposed within the connectivity bit for coupling to the reciprocating device to lock in place the connectivity bit to the reciprocating device.

14. The disposable reciprocating cutter system of claim 10, wherein the connectivity bit coupled to the cable saw is generally cylindrical on a first end and having an opening within which to receive and couple the cable saw with a pin extending through the cylindrical first end and a fastener to the cable saw and substantially flat on a second end for placement within a receiving area the reciprocating device.

15. A reciprocating cutter system comprising:

a power-driven reciprocating tool to provide a back-and-forth motion;

a housing;

a handle disposed on a top portion of the housing to provide an operator a user grip to operate the system;

a cable saw;

an anchor disposed within the housing;

a spring securely disposed within the housing and coupled to the anchor which is coupled to the cable saw such that as the cable saw is moved in a back-and-forth motion when in use, the spring and anchor also moves in a back-and forth-motion without the operator-held handle needing to move; and a connectivity bit, coupled to the cable saw, to connect the cable saw through the connectivity bit to the power-driven reciprocating tool, the power-driven reciprocating tool to provide the back-and-forth motion to the connectivity bit and therefore the cable saw.

16. The reciprocating cutter system of claim 15, further comprising:

a first pin with which to couple the cable saw to the housing of reciprocating cutter system;

a second pin with which to couple the cable saw to the connectivity bit to connect the cable saw to the reciprocating device;

wherein the cable saw is thus interchangeable and replaceable.

17. The reciprocating cutter system of claim 15, further comprising:

an end cap securely disposed about a circumference of the housing at a distal end of the housing from the handle to provide a backstop to the spring securely disposed within the housing, the end cap further defined by an aperture in a center of the end cap and the aperture of a diameter just larger than the cable saw such that the cable saw feeds through the aperture to couple to the spring via the anchor; and a protective sheath to cover the wire loop handle and protect the hand of the operator from wear.

18. The reciprocating cutter system of claim 15, further comprising:

an aperture disposed within the connectivity bit for coupling to the reciprocating device to lock in place the connectivity bit to the reciprocating device; and wherein the connectivity bit coupled to the cable saw is generally cylindrical on a first end and having an opening within which to receive and couple the cable saw with a pin extending through the cylindrical first end and a fastener to the cable saw and substantially flat on a second end for placement within a receiving area the reciprocating device.

* * * * *